United States Patent
Yasuoka et al.

(10) Patent No.: US 11,579,101 B2
(45) Date of Patent: Feb. 14, 2023

(54) METHOD FOR SIMULATING PHENOMENON INVOLVING PHASE CHANGE

(71) Applicant: Panasonic Intellectual Property Management Co., Ltd., Osaka (JP)

(72) Inventors: Haruka Yasuoka, Osaka (JP); Keiichi Yamamoto, Osaka (JP); Yusuke Fujita, Osaka (JP); Fumiya Matsushita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 877 days.

(21) Appl. No.: 16/417,240

(22) Filed: May 20, 2019

(65) Prior Publication Data
US 2019/0376913 A1 Dec. 12, 2019

(30) Foreign Application Priority Data
Jun. 6, 2018 (JP) .............................. JP2018-108649

(51) Int. Cl.
*G01N 25/08* (2006.01)

(52) U.S. Cl.
CPC .................................. *G01N 25/08* (2013.01)

(58) Field of Classification Search
CPC combination set(s) only.
See application file for complete search history.

(56) References Cited

U.S. PATENT DOCUMENTS

| 9,130,219 B1* | 9/2015 | Huang ................ H01M 8/18 |
| 11,071,840 B2* | 7/2021 | Reeh ................. A63B 23/18 |
| 2010/0323279 A1 | 12/2010 | Fujiuchi et al. |

FOREIGN PATENT DOCUMENTS

| JP | 2009-193672 A | 8/2009 |
| JP | 2009-211940 A | 9/2009 |
| JP | 2009-245874 A | 10/2009 |
| JP | 2015-135790 | 7/2015 |

OTHER PUBLICATIONS

Loo et al. "Derivation of a Fast Mathematical Model of PEM Fuel Cell With Two-Phase Water Transport", IEEE Transactions on Energy Conversation, vol. 26, No. 1, Mar. 2011. (Year: 2011).*
Lei Xing et al., "A two-phase flow and non-isothermal agglomerate model for a proton exchange membrane (PEM) fuel cell", Energy 73 (2014), Aug. 14, 2014, pp. 618-634.
The Extended European Search Report dated Nov. 18, 2019 for the related European Patent Application No. 19170066.5.
(Continued)

*Primary Examiner* — Lisa M Caputo
*Assistant Examiner* — Nasir U. Ahmed
(74) *Attorney, Agent, or Firm* — McDermott Will & Emery LLP (57) ABSTRACT

A method for simulating a phenomenon involving phase change includes: calculating, by a processor, a degree of phase change in a porous medium per unit volume and unit time based on an area of a gas-liquid interface in the porous medium per unit volume and a phase change rate at the gas-liquid interface.

2 Claims, 9 Drawing Sheets

(56) References Cited

OTHER PUBLICATIONS

Wu He T Al : "Steady and unsteady 3D non-isothermal modeling of PEM fuel cells with the effect of non-equilibrium phase transfer",Applied Energy, Elsevier Science Publishers, GB, vol. 87, No. 9, Sep. 1, 2010 (Sep. 1, 2010), 2778-2784, XP027095889.
Matamoros L et al : "Simulation of the water and heat management in proton exchange membrane fuel cells", Journal of Power Sources, Elsevier SA, vol. 161, No. 1, Oct. 20, 2006 (Oct. 20, 2006), 203-213, XP027938741.

* cited by examiner

METHOD FOR SIMULATING PHENOMENON INVOLVING PHASE CHANGE

BACKGROUND

1. Technical Field

The present disclosure relates to a method for simulating a phenomenon involving phase change.

2. Description of the Related Art

The performance of a fuel cell including a porous medium is affected by the transport of fluid water (liquid water) in the porous medium. In this respect, for example, Japanese Unexamined Patent Application Publication No. 2015-135790 discloses a method for simulating the electricity generation performance of a fuel cell including an electrolyte membrane and electrodes. In this method, the structure of a catalyst layer is calculated, the performance of the catalyst layer is calculated based on, for example, the evaluation of water transport, and the electricity generation performance of the fuel cell is calculated based on the performance of the catalyst layer.

Liquid water transport in a porous medium is affected by not only the gradient of pressure applied to the liquid water, but also the phase change between evaporation and condensation. According to the method discussed in Energy Vol. 73, pp. 618-634 (2014), the degree of phase change such as the amount of evaporation and the amount of condensation in regard to liquid water is, for example, determined in proportion to the filling rate (the degree of saturation) of the liquid water in a porous medium.

SUMMARY

One non-limiting and exemplary embodiment provides a method for simulating with high accuracy a phenomenon involving phase change.

In one general aspect, the techniques disclosed here feature a method for simulating a phenomenon involving phase change, the method including calculating, by a processor, the degree of phase change in a porous medium per unit volume and unit time based on the area of the gas-liquid interface in the porous medium per unit volume and the phase change rate at the gas-liquid interface.

The present disclosure has an advantage in which a method for simulating with high accuracy a phenomenon involving phase change is provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

The present inventors considered the improvement of accuracy of simulation concerning liquid water in a porous medium. The phase change of liquid water occurs such that water molecules transfer across the gas-liquid interface of the liquid water. However, in the method discussed in Energy Vol. 73, pp 618-634 (2014), the degree of phase change of liquid water is determined based on the filling rate of the liquid water in a porous medium, and thus, the area of the gas-liquid interface in the porous medium is not reflected in the degree of phase change of the liquid water. The present inventors accordingly found that the accuracy of simulation can be improved by calculating the degree of phase change of liquid water in consideration of the area of the gas-liquid interface in a porous medium.

According to a first aspect of the present disclosure, in a method for simulating a phenomenon involving phase change, the degree of phase change in a porous medium per unit volume and unit time is calculated based on the area of a gas-liquid interface in the porous medium per unit volume and a phase change rate at the gas-liquid interface.

With this method, the degree of phase change of liquid water (the amount of evaporation and the amount of condensation) is calculated based on the area of the gas-liquid interface in the porous medium per unit volume. This enables highly accurate simulation of the degree of phase change of liquid water in consideration of the gas-liquid interface between gas and liquid water where phase change occurs.

According to a second aspect of the present disclosure, in the method for simulating a phenomenon involving phase change according to the first aspect of the present disclosure, before the degree of phase change is calculated, structure information of the porous medium may be obtained, and the area of the gas-liquid interface in the porous medium per unit volume may be calculated based on the structure information of the porous medium. With this method, the simulation of the degree of phase change of liquid water can be performed in consideration of the structure of the porous medium.

According to a third aspect of the present disclosure, in the method for simulating a phenomenon involving phase change according to the first aspect of the present disclosure, before the degree of phase change is calculated, the area of the gas-liquid interface in the porous medium per unit volume may be obtained. This method enables highly accurate simulation of the degree of phase change of liquid water in consideration of the obtained area of the gas-liquid interface.

According to a fourth aspect of the present disclosure, in the method for simulating a phenomenon involving phase change according to any of the first to third aspects of the present disclosure, before the degree of phase change is calculated, the phase change rate at the gas-liquid interface may be calculated by using the molecular dynamics method. With this method, the phase change rate coefficient that determines the amount of evaporating liquid water per unit area and unit volume can be determined. This enables highly accurate simulation of the degree of phase change of liquid water in consideration of the phase change rate calculated by using a molecular dynamics method. Furthermore, with this simulation method, by using the molecular dynamics method, the phase change rate at the gas-liquid interface can be obtained more easily than, for example, conducting an experiment.

According to a fifth aspect of the present disclosure, in the method for simulating a phenomenon involving phase change according to any of the first to third aspects of the present disclosure, before the degree of phase change is calculated, the phase change rate at the gas-liquid interface may be obtained. This method enables highly accurate simulation of the degree of phase change of liquid water in consideration of the obtained phase change rate.

According to a sixth aspect of the present disclosure, in the method for simulating a phenomenon involving phase change according to any of the first to fifth aspects of the present disclosure, the liquid water distribution in a fuel cell including the porous medium may be calculated based on the degree of phase change in the porous medium per unit volume and unit time. This method enables highly accurate simulation of the liquid water distribution in a fuel cell in consideration of the gas-liquid interface of the liquid water.

According to a seventh aspect of the present disclosure, in the method for simulating a phenomenon involving phase change according to the sixth aspect of the present disclosure, the effective mutual diffusion coefficient of gases diffusing in voids other than liquid water in the porous medium may be calculated by using a simulation method based on the concept of the Boltzmann equation, and based on the effective mutual diffusion coefficient of the gases, the gas distribution of the gases in the fuel cell may be calculated, and consequently, the potential distribution in the fuel cell may be calculated based on the liquid water distribution in the fuel cell and the gas distribution in the fuel cell.

This enables highly accurate simulation of the potential distribution in a fuel cell (the electricity generation performance projection). It should be noted that the simulation method based on the concept of the Boltzmann equation denotes the lattice Boltzmann method and the lattice gas method.

Hereinafter, embodiments of the present disclosure are specifically described with reference to the drawings. It should be noted that in the following description the same or corresponding elements in the drawings are denoted by the same reference numerals, and redundant descriptions thereof are omitted.

First Embodiment

Configuration of Simulation Apparatus

Figure 1:
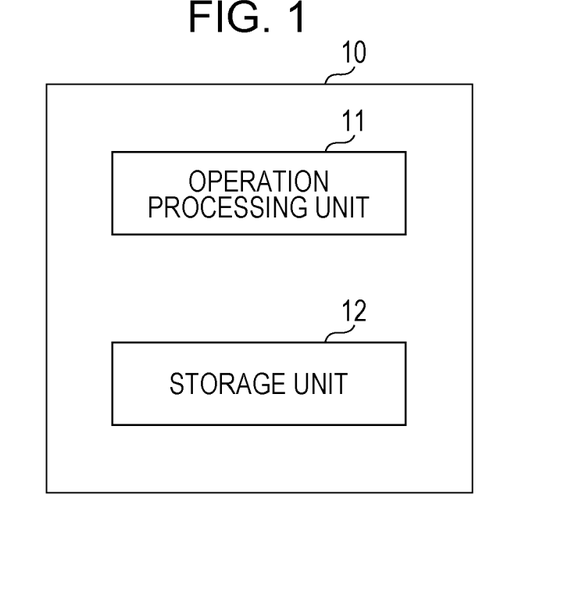
FIG. 1 is a functional block diagram illustrating an apparatus for simulating a phenomenon involving phase change according to a first embodiment of the present disclosure.

A simulation apparatus 10 according to a first embodiment of the present disclosure, which simulates a phenomenon involving phase change and is illustrated in FIG. 1, projects, for example, the degree of phase change of fluid water (liquid water) in a porous medium. The porous medium is exemplified by, for example, a gas diffusion layer and a catalyst layer that are used in a fuel cell. The simulation apparatus 10 is thus used as, for example, a simulation apparatus for a fuel cell as described in the above example but can be used for other purposes.

The phase change of liquid water is the change of water from liquid to gas (evaporation) and the change of water from gas to liquid (condensation). The degree of phase change of liquid water corresponds to the amount of evaporated water (the amount of evaporation) or the amount of condensed water (the amount of condensation).

The simulation apparatus 10 includes an operation processing unit 11 and a storage unit 12 and is implemented as, for example, a computer. The operation processing unit 11 is exemplified by, for example, a CPU or a processor in a computer, and the storage unit 12 is exemplified by, for example, a memory that can be accessed by the operation processing unit 11.

The storage unit 12 stores a program for simulating, for example, the phase change of liquid water in a porous medium and information used for the simulation. It should be noted that such a program and such information used for the simulation are not necessarily stored in a memory of a computer and may be stored on a storage medium, input via an input device, or received via a network.

The operation processing unit 11 simulates, for example, the phase change of liquid water in a porous medium by running software such as the program loaded from the storage unit 12. The simulation apparatus 10 may be implemented as a single device or as multiple devices that cooperate with each other.

Structure of Porous Medium

Figure 2:
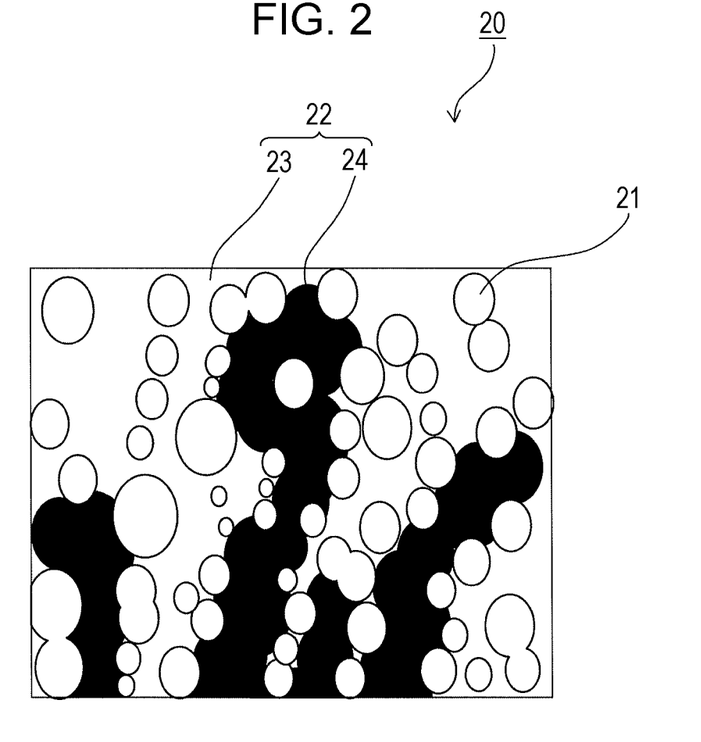
FIG. 2 is a schematic sectional view of a porous medium used in a method for simulating a phenomenon involving phase change.

A porous medium 20 illustrated in FIG. 2, which is targeted for simulation, is described. The porous medium 20 includes a wall portion 21 and a large number of pores 22. The wall portion 21 is formed of, for example, an organic material such as resin, a carbon catalyst support, or the like, an inorganic material such as glass, or a material mixture thereof.

The pore 22 is a space enclosed by the wall portion 21 in the porous medium 20. When fluid water (the liquid water 24) is distributed in the pore 22, gas particles can move within a space (a void 23) that is the space of the pore 22 not filled with the liquid water 24. The void 23 is thus a space of the porous medium 20 other than the wall portion 21 and the liquid water 24. In the case of a fuel cell, examples of gas particles include hydrogen particles, oxygen particles, and nitrogen particles.

Method for Simulating Phenomenon Involving Phase Change

Figure 10:
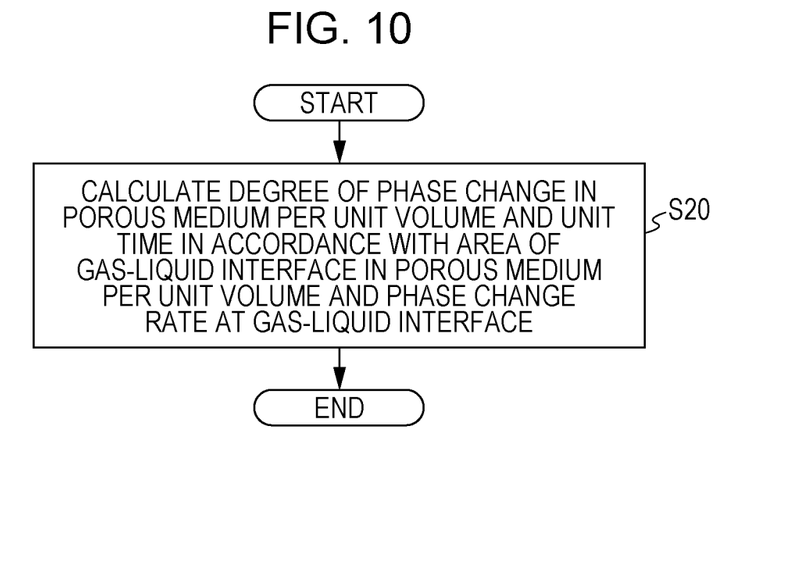
FIG. 10 is a flowchart illustrating an example of a simulation method according to the first embodiment.

A method for simulating a phenomenon involving phase change is performed by, for example, the simulation apparatus 10 in FIG. 1 in accordance with the process flow in the flowchart illustrated in FIG. 10. Here, the degree of phase change of the liquid water 24 in the porous medium 20 illustrated in FIG. 2 per unit volume and per unit time is simulated.

The operation processing unit 11 of the simulation apparatus 10 calculates the degree of phase change in the porous medium 20 per unit volume and unit time based on the area of a gas-liquid interface in the porous medium 20 per unit volume and the phase change rate at the gas-liquid interface (step S20).

The phase change of the liquid water 24 occurs at the gas-liquid interface of the liquid water 24 (the surface of the liquid water 24) in contact with the voids 23 in the pores 22 of the porous medium 20. The area of the gas-liquid interface in the porous medium 20 per unit volume (a specific surface area $S_f$) is the area of the gas-liquid interface of the liquid water 24 in contact with the voids 23 in the pores 22 in the porous medium 20 per unit volume. The phase change rate at the gas-liquid interface (a phase change rate coefficient k) is the rate at which the liquid water 24 evaporates at the gas-liquid interface or the rate at which gas condenses into the liquid water 24 at the gas-liquid interface.

According to the phase change rate coefficient k and the specific surface area $S_f$, the operation processing unit 11 calculates the degree of phase change of the liquid water 24 in the porous medium 20 per unit volume and unit time, that is, the phase change rate at the gas-liquid interface in the porous medium 20 per unit volume (the degree of phase change per unit volume and unit time $r_w$) by using Equation 3 indicated below.

In Equation 3, k is the phase change rate coefficient. The water vapor partial pressure $p_{wv}$ of the liquid water 24, the saturated vapor pressure $p_{sat}$ of the liquid water 24, and the temperature T are determined based on the desired simulation conditions.

$$r_w = S_f k \frac{p_{wv} - p_{sat}}{RT} M_{H_2O} \quad \text{(Equation 3)}$$

In this method for simulating a phenomenon involving phase change, the degree of phase change $r_w$ per unit volume and unit time is calculated based on the specific surface area $S_f$ and the phase change rate coefficient k of the liquid water 24. As described above, by taking into consideration the area (the surface area) of the gas-liquid interface of the liquid water 24 where phase change occurs in the porous medium 20 by using the specific surface area $S_f$ of the liquid water 24, the degree of phase change $r_w$ of the liquid water 24 per unit volume and unit time can be simulated highly accurately.

First Modified Exemplary Embodiment

In a method for simulating a phenomenon involving phase change according to a first modified exemplary embodiment, before the degree of phase change is calculated, structure information of the porous medium 20 is obtained and the area of the gas-liquid interface in the porous medium 20 per unit volume is calculated based on the structure information of the porous medium 20. This simulation method is performed by the simulation apparatus 10 in FIG. 1 in accordance with the process flow in the flowchart illustrated in FIG. 11.

Figure 11:
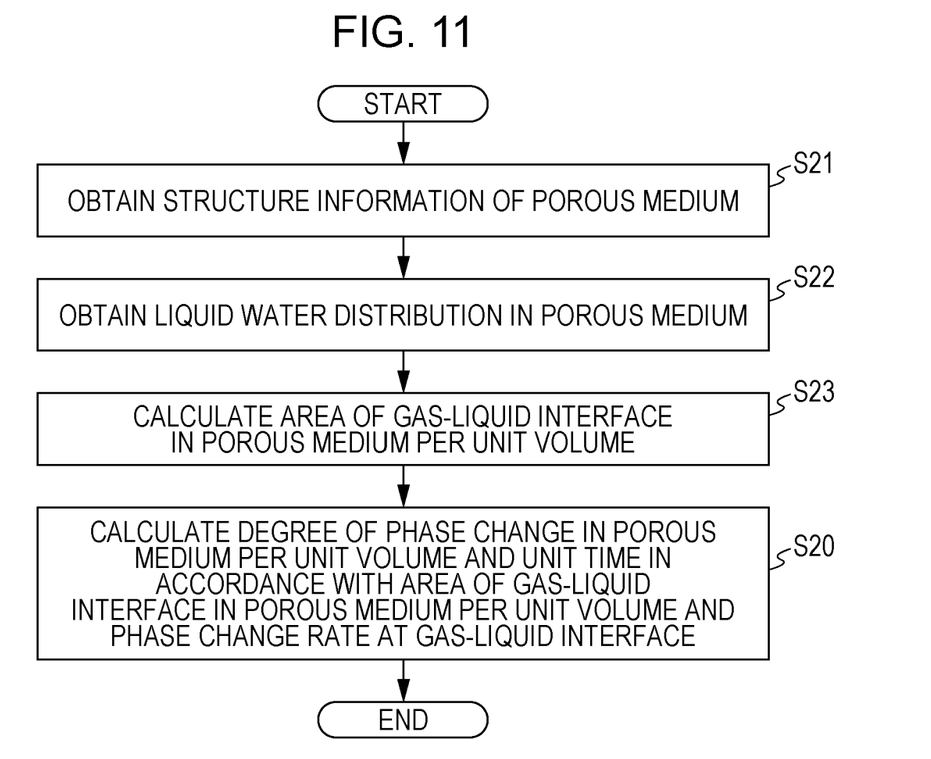
FIG. 11 is a flowchart illustrating an example of a simulation method according to a first modified exemplary embodiment.

Specifically, the operation processing unit 11 obtains the structure information of the porous medium 20 targeted in the simulation method in FIG. 11 (step S21). The structure information of the porous medium 20 contains information about the shape and the material of the porous medium 20.

For example, the material information of the wall portion 21 of the porous medium 20 is, for example, the contact angle θ between the liquid water 24 and the wall portion 21, which can be determined in advance by, for example, conducting an experiment. An example of the information on the liquid water 24 in the porous medium 20 is the surface tension γ, which is determined in advance by, for example, conducting an experiment.

The shape information of the wall portion 21 is obtained by using, for example, image data of the porous medium 20. For example, sectional images of the porous medium 20 are captured in series at different positions in a given direction by using a focused ion beam scanning electron microscope (FIB-SEM).

An image (an image stack) obtained by stacking these sectional images is binarized by performing image processing. With this processing, a computational mesh for simulation including location information of pore planes is generated as the shape information of the porous medium 20. To obtain the shape information of the porous medium 20 on the basis of the image stack, analysis software such as GeoDict (registered trademark in Germany), a product of Math2Market GmbH, may be utilized.

The operation processing unit 11 obtains the distribution of the liquid water 24 (the liquid water distribution) in the porous medium 20 about which information has been obtained in step S21 (step S22). The liquid water distribution is location information (for example, coordinates) on the liquid water 24 in the pores 22 of the porous medium 20 and calculated based on the following Equation 2 by performing the simulation according to a pore morphology method in which the porous medium 20 is filled with the liquid water 24 as described below.

$$P_c = \frac{2\gamma \cos\theta}{r} \quad \text{(Equation 2)}$$

For example, this can be calculated by using analysis software such as GeoDict developed by Math2Market GmbH. Specifically, according to the material information of the wall portion 21 of the porous medium 20 and the pressure (the capillary pressure), a radius of a void where the liquid water 24 can be present in the porous medium 20 is determined by using the Young-Laplace equation indicated as Equation 2. In Equation 2, $p_c$ is the capillary pressure (Pa) and r is the radius (m) of a void. Also in Equation 2, γ is the surface tension (N/m) of the liquid water 24 and θ is the contact angle (°) between the wall portion 21 and the liquid water 24, both of which are obtained from the material information of the wall portion 21.

When the contact angle θ of the liquid water 24 with respect to the wall portion 21 of the porous medium 20 exceeds 90° (θ>90°), the wall portion 21 is water repellent. In this case, a force that pushes the liquid water 24 out of the pore 22 is applied to the liquid water 24 by the capillary pressure $P_c$. By applying the capillary pressure $P_c$, a minimum radius r of the void 23 into which the liquid water 24 enters is obtained based on Equation 2. On the basis of the minimum radius r of the void 23, the simulation in which the porous medium 20 is filled with the liquid water 24 continuously entering from a given plane of the porous medium 20 is performed by employing the pore morphology method.

In this manner, the location information of the liquid water 24 in the porous medium 20 is obtained as the liquid water distribution.

By contrast, when the contact angle θ of the liquid water 24 falls below 90° (θ<90°), the wall portion 21 of the porous medium 20 is water attracting. In this case, a force that pulls the liquid water 24 into the pore 22 is applied to the liquid water 24 by the capillary pressure $P_c$. By applying the capillary pressure $P_c$, a maximum radius r of the void 23 from which the liquid water 24 is discharged while being replaced with gas is obtained based on Equation 2. On the basis of the maximum radius r of the void 23, the simulation in which the liquid water 24 is continuously discharged from a given plane of the porous medium 20 is performed based on the shape information of the porous medium 20 by employing the pore morphology method. In this manner, the location information of the liquid water 24 in the porous medium 20 is obtained as the liquid water distribution.

Here, changing the capillary pressure $P_c$ varies the filling rate of the liquid water 24 in the porous medium 20. Accordingly, by successively performing the simulation while the value of the capillary pressure $P_c$ is changed in Equation 2, the liquid water distribution is obtained as a function of the filling rate. The filling rate of the liquid water 24 is set within a range of 0 to 1. When the filling rate of the liquid water 24 is 0, the liquid water 24 is not present in the pores 22. When the filling rate of the liquid water 24 is 1, the pores 22 are completely filled with the liquid water 24.

By using, for example, the analysis software GeoDict developed by Math2Market GmbH, the liquid water distribution is determined based on the structure information of the porous medium 20 and the filling rate of the liquid water 24.

Subsequently, the operation processing unit 11 calculates the area (the specific surface area $S_f$) of the gas-liquid interface in the porous medium 20 per unit volume based on the liquid water distribution obtained in step S22 (step S23).

Here, the location of the pores 22 is obtained based on the shape information of the wall portion 21 obtained in step S21. In addition, the location of the liquid water 24 in the pores 22 is obtained based on the liquid water distribution obtained in step S22. Based on these locations, the area (the surface area) of the gas-liquid interface, at which the liquid water 24 and the void 23 are in contact with each other in the porous medium 20, is calculated.

Consequently, the specific surface area $S_f$ of the liquid water 24 is calculated by dividing the area of the gas-liquid interface by the volume of the porous medium 20. Here, when the liquid water distribution is expressed by using a function of the filling rate, the corresponding specific surface area $S_f$ of the liquid water 24 is also expressed by using the function of the filling rate. The specific surface area $S_f$ of the liquid water 24 can be obtained by using, for example, software such as GeoDict developed by Math2Market GmbH.

The operation processing unit 11 then calculates the degree of phase change rw in the porous medium 20 per unit volume and unit time based on the phase change rate coefficient k at the gas-liquid interface and the specific surface area Sf of the liquid water 24 calculated in step S23 by using Equation 3 described above (step S20).

In this manner, the degree of phase change $r_w$ in the porous medium 20 per unit volume and unit time is calculated by using the specific surface area $S_f$ of the liquid water 24 calculated based on the structure information of the porous medium 20. This enables highly accurate simulation of the degree of phase change $r_w$ of the liquid water 24 per unit volume and unit time in consideration of the structure of the porous medium 20.

Second Modified Exemplary Embodiment

In a method for simulating a phenomenon involving phase change according to a second modified exemplary embodiment, before the degree of phase change is calculated, the area of the gas-liquid interface in the porous medium 20 per unit volume is obtained. In this simulation method, instead of the processing operations in steps S21 to S23 in the flowchart illustrated in FIG. 11, the processing operation in step S24 in the flowchart illustrated in FIG. 12 is performed.

Figure 12:
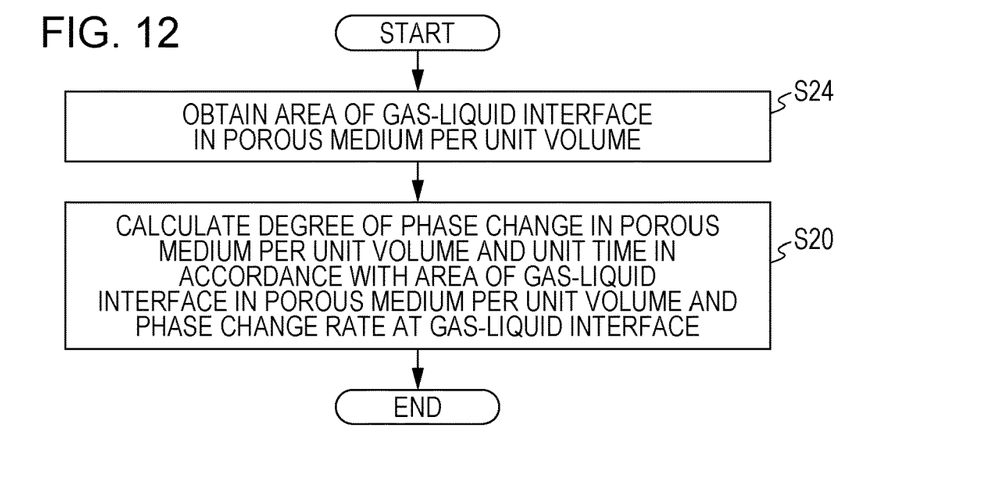
FIG. 12 is a flowchart illustrating an example of a simulation method according to a second modified exemplary embodiment.

Specifically, the operation processing unit 11 obtains the area (the specific surface area $S_f$) of the gas-liquid interface per unit volume of the porous medium 20 targeted in the simulation method in FIG. 12 (step S24). It should be noted that the specific surface area $S_f$ may be a value that is input into the simulation apparatus 10 and is, for example, not necessarily stored in the storage unit 12 and may be stored in another storage medium, input into the simulation apparatus 10 via an input device, or received via a network.

The operation processing unit 11 then calculates the degree of phase change $r_w$ in the porous medium 20 per unit volume and unit time based on the phase change rate coefficient k at the gas-liquid interface and the specific surface area $S_f$ of the liquid water 24 obtained in step S24 by using Equation 3 described above (step S20).

In this manner, the degree of phase change $r_w$ in the porous medium 20 per unit volume and unit time is calculated by using the obtained specific surface area $S_f$ of the liquid water 24. This enables highly accurate simulation of the degree of phase change $r_w$ of the liquid water 24 per unit volume and unit time based on the obtained specific surface area $S_f$.

Third Modified Exemplary Embodiment

In a method for simulating a phenomenon involving phase change according to a third modified exemplary embodiment, before the degree of phase change is calculated, the phase change rate at the gas-liquid interface is calculated by using the molecular dynamics method. This simulation method is performed by the simulation apparatus 10 in FIG. 1 in accordance with the process flow in the flowchart illustrated in FIG. 13.

Figure 13:
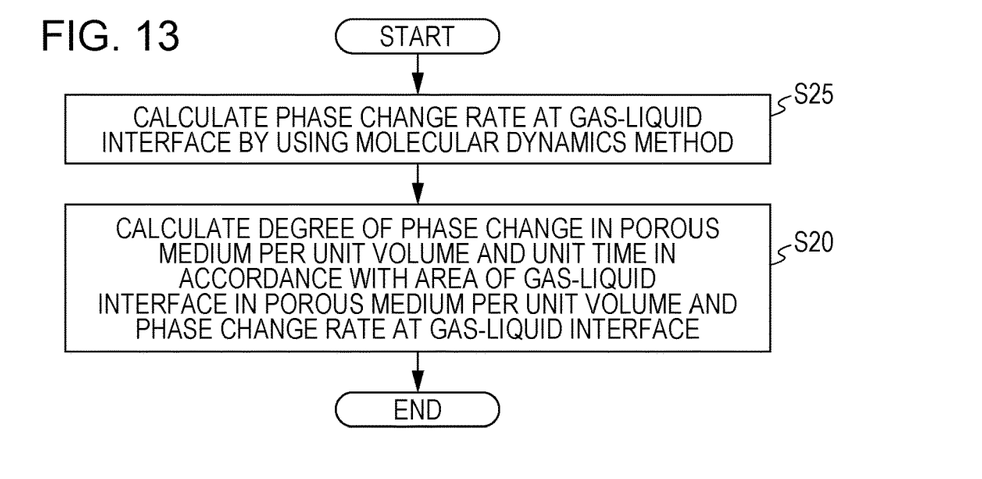
FIG. 13 is a flowchart illustrating an example of a simulation method according to a third modified exemplary embodiment.

Specifically, the operation processing unit 11 calculates the phase change rate (the phase change rate coefficient k) at the gas-liquid interface (step S25). The phase change rate is obtained by, for example, performing a simulation in the analysis area 30 illustrated in FIG. 3 by employing the molecular dynamics method.

Figure 3:
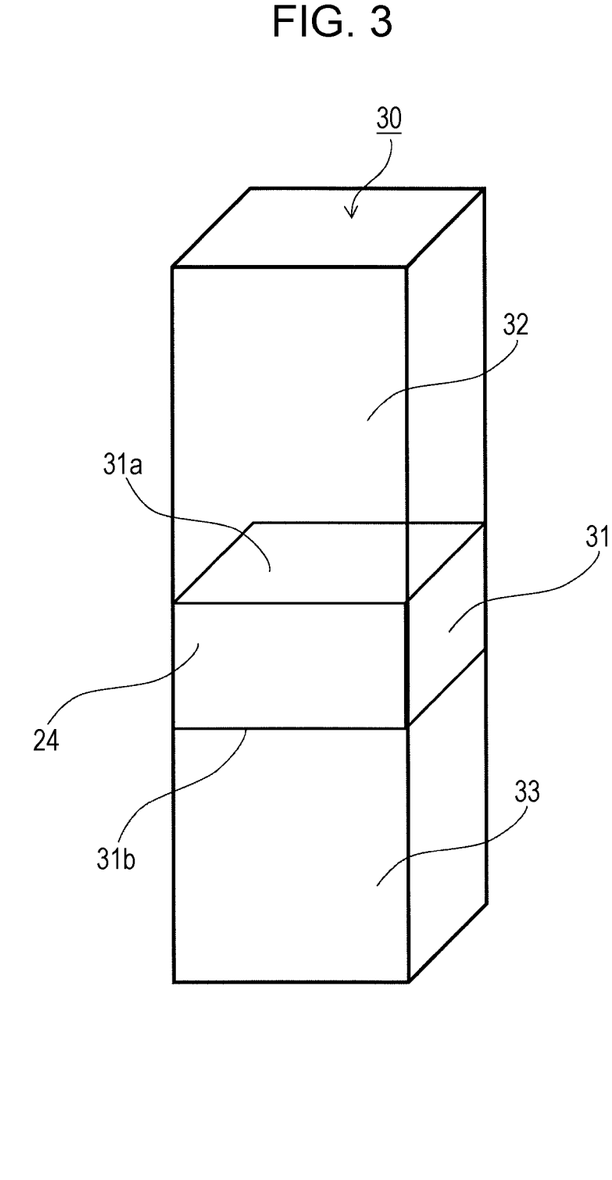
FIG. 3 is a schematic perspective view of an analysis area relating to the phase change rate at a gas-liquid interface.

The analysis area 30 is, for example, a parallelepiped space. In the analysis area 30, the liquid water 24 (a liquid membrane 31) having a parallelepiped volume with membrane-like thinness is disposed. The liquid membrane 31 extends in a direction perpendicular to the longitudinal direction of the analysis area 30 and is placed to separate the analysis area 30 into two sections (a first space 32 and a second space 33). The liquid membrane 31 thus has a surface (a first surface 31a) in contact with the first space 32 and another surface (a second surface 31b) in contact with the second space 33. At the gas-liquid interface of the liquid water 24 composed of the first surface 31a and the second surface 31b, the phase of water molecules in the liquid membrane 31 is changed.

In the analysis area 30, heat energy is applied to the liquid membrane 31 in a state of equilibrium. As a result, water molecules in the liquid membrane 31 evaporate at the gas-liquid interface of the liquid water 24 and become gas molecules. The number of gas molecules is periodically counted, and the changes in the number of gas molecules with the passage of time are obtained as illustrated in the graph in FIG. 4.

Figure 4:
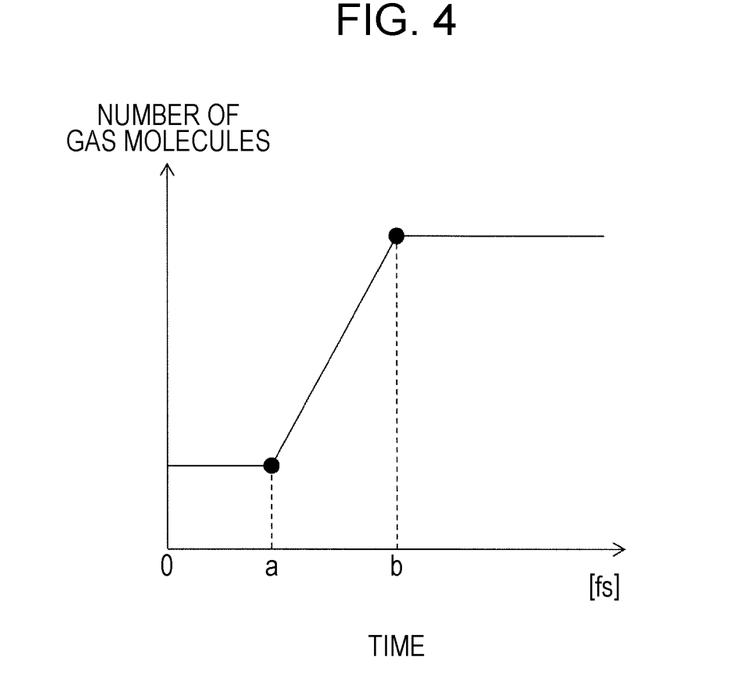
FIG. 4 is a graph illustrating changes in the number of gas molecules with the passage of time.

As illustrated in the graph in FIG. 4, in the changes with the passage of time from time 0 to time a, the number of gas molecules remains equal to a predetermined value or less, which means that the liquid membrane 31 is in a state of equilibrium. At the time a, a predetermined amount of energy is applied to the liquid membrane 31. As a result, the change in the number of gas molecules with the passage of time starts increasing at the time a, and water molecules start evaporating. At time b, the change in the number of gas molecules with the passage of time stops increasing, and water molecules also stop evaporating, and the liquid membrane 31 enters a state of equilibrium. Based on the changes in the number of gas molecules with the passage of time from the time a to the time b, the phase change rate $r_0$ at the gas-liquid interface is obtained.

By substituting the phase change rate $r_0$ at the gas-liquid interface and simulation conditions in Equation 1 indicated below, the phase change rate (the phase change rate coefficient k) of the liquid water 24 per unit area of the gas-liquid interface is calculated. In Equation 1, $S_0$ is the area of the gas-liquid interface of the liquid water 24 (the surface area of the liquid water 24) per unit volume and is a value obtained by dividing the total area of the first surface 31a and the second surface 31b of the liquid membrane 31 by the volume of the analysis area 30, R is the gas constant, and $MH_2O$ is the molecular mass of the liquid water 24. Also in Equation 1, $p_{wv}$ is the water vapor partial pressure of the liquid water 24, $p_{sat}$ is the saturated vapor pressure of the liquid water 24, and T is the temperature, which are determined based on the simulation conditions.

$$r_0 = S_0 k \frac{p_{wv} - p_{sat}}{RT} M_{H_2O} \quad \text{(Equation 1)}$$

The operation processing unit 11 then calculates the degree of phase change $r_w$ in the porous medium 20 per unit volume and unit time based on the phase change rate coefficient k at the gas-liquid interface calculated in step S25 and the specific surface area $S_f$ of the liquid water 24 by using Equation 3 described above (step S20).

In this manner, the degree of phase change $r_w$ in the porous medium 20 per unit volume and unit time is calculated by using the calculated phase change rate at the gas-liquid interface. This enables highly accurate simulation of the degree of phase change $r_w$ of the liquid water 24 per unit volume and unit time based on the calculated conditions.

In this simulation method, the phase change rate at the gas-liquid interface can be obtained by performing the simulation using the molecular dynamics method. By using this phase change rate, the phase change rate coefficient k at the gas-liquid interface can be obtained more easily than by, for example, conducting an experiment.

It should be noted that in step S20 the specific surface area $S_f$ of the liquid water 24 may be, for example, calculated by the simulation apparatus 10 as in the first modified exemplary embodiment or obtained by the simulation apparatus 10 as in the second modified exemplary embodiment.

Figure 5:
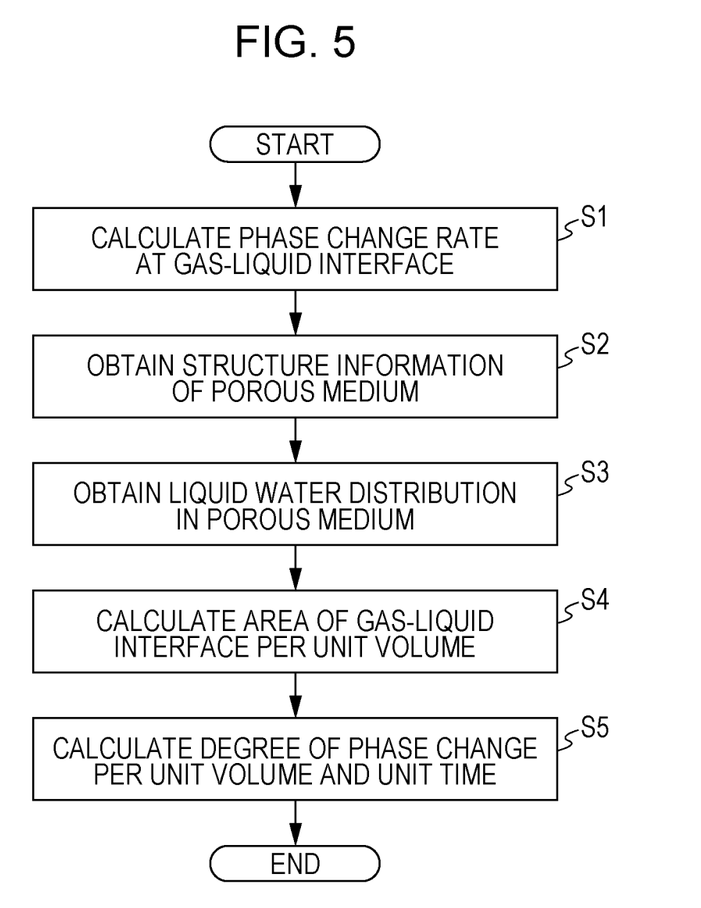
FIG. 5 is a flowchart illustrating an example of a simulation method according to a modified exemplary embodiment.

For example, in the case where the phase change rate coefficient k at the gas-liquid interface and the specific surface area $S_f$ of the liquid water 24 are calculated by the simulation apparatus 10, the method for simulating a phenomenon involving phase change is performed in accordance with the process flow in the flowchart illustrated in FIG. 5. Step S1 in FIG. 5 corresponds to step S25 in FIG. 13, steps S2 to S4 in FIG. 5 correspond to steps S21 to S23 in FIG. 11, and step S5 in FIG. 5 corresponds to step S20 in FIG. 11.

Fourth Modified Exemplary Embodiment

Figure 14:
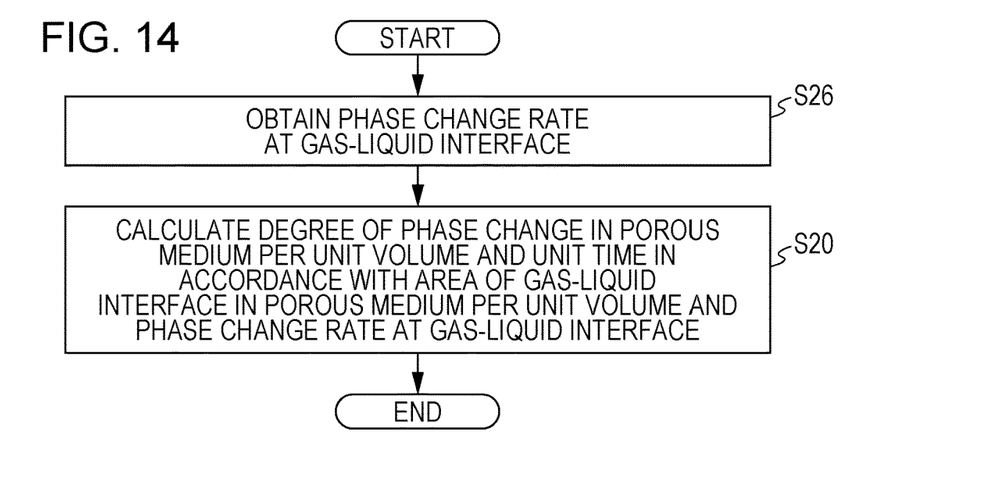
FIG. 14 is a flowchart illustrating an example of a simulation method according to a fourth modified exemplary embodiment.

In a method for simulating a phenomenon involving phase change according to a fourth modified exemplary embodiment, before the degree of phase change is calculated, the phase change rate at the gas-liquid interface is obtained. In this simulation method, instead of the processing operation in step S25 in the flowchart illustrated in FIG. 13, the processing operation in step S26 in a flowchart in FIG. 14 is performed.

Specifically, the operation processing unit 11 obtains the phase change rate (the phase change rate coefficient k) at the gas-liquid interface (step S25). It should be noted that the phase change rate coefficient k may be an value that is input into the simulation apparatus 10, and is, for example, not necessarily stored in the storage unit 12 and may be stored in another storage medium, input via an input device, or received via a network.

The operation processing unit 11 then calculates the degree of phase change $r_w$ in the porous medium 20 per unit volume and unit time based on the phase change rate coefficient k at the gas-liquid interface obtained in step S26 and the specific surface area $S_f$ of the liquid water 24 by using Equation 3 described above (step S20).

This enables highly accurate simulation of the degree of phase change $r_w$ of the liquid water 24 per unit volume and unit time based on the obtained phase change rate coefficient k.

It should be noted that in step S20 the specific surface area $S_f$ of the liquid water 24 may be, for example, calculated by the simulation apparatus 10 as in the first modified exemplary embodiment or obtained by the simulation apparatus 10 as in the second modified exemplary embodiment.

Second Embodiment

Figure 6:
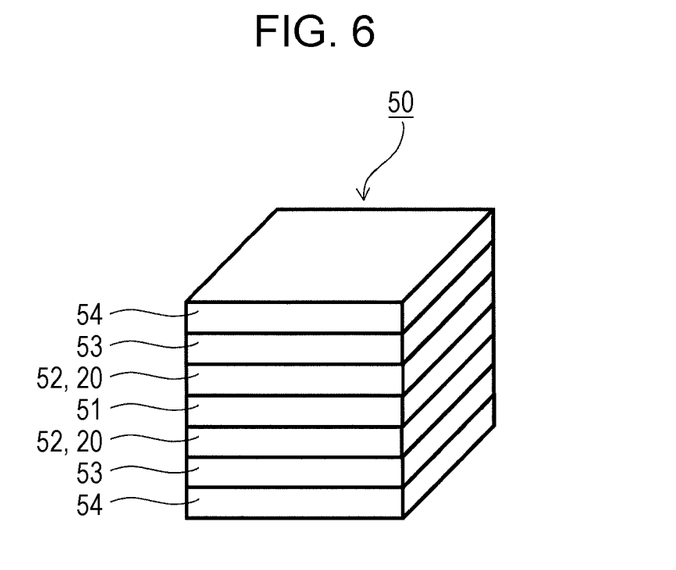
FIG. 6 is a schematic perspective view of a fuel cell.

The simulation apparatus 10 according to a second embodiment of the present disclosure projects the distribution of the liquid water 24 (the liquid water distribution) in a fuel cell 50 illustrated in FIG. 6 as the electricity generation performance.

The fuel cell 50 is composed of, for example, an electrolyte membrane 51, a pair of catalyst layers 52 between which the electrolyte membrane 51 is interposed, a pair of gas diffusion layers 53 between which the catalyst layers 52 are interposed, and gas passages 54 between which the gas diffusion layers 53 are interposed. Among these, at least one pair of the pair of the catalyst layers 52 and the pair of the gas diffusion layers 53 are formed of the porous medium 20.

In the method for simulating a phenomenon involving phase change performed by the simulation apparatus 10, the filling rate of the liquid water 24 in the fuel cell 50 is calculated.

Determination of Liquid Water Distribution in Fuel Cell

Based on the phase change rate in the porous medium 20 per unit volume (the degree of phase change $r_w$ per unit volume and unit time), the liquid water distribution in the fuel cell 50 is calculated by using Equation 4 indicated later. Here, the conditions in the fuel cell 50 are substituted in Equation 4.

In Equation 4, ε is the ratio of the voids 23 to the pores 22 (the void rate), $\rho_l$ is the density of the liquid water 24, s is the filling rate of the liquid water 24 in the pores 22, and t is the time (sec). In addition, K is the permeability of the liquid water 24 and r is the degree of the filling rate of the liquid water 24. Pc is the capillary pressure, which is obtained by using Equation 1 described above. $\mu_l$ is the viscosity of the liquid water 24. $r_w$ is the degree of phase change of the liquid water 24 per unit volume and unit time, which is obtained by using Equation 3 described above.

$$\frac{\partial \varepsilon \rho_l s}{\partial t} + \nabla \cdot \left(\rho_l \frac{K}{\mu_l} \frac{dP_c}{ds} \nabla s\right) = r_w \quad \text{(Equation 4)}$$

As such, the distribution of the filling rate s of the liquid water 24 in the fuel cell 50 is obtained based on Equation 4. This can be calculated by using software such as FLUENT (registered trademark).

Method for Simulating Phenomenon Involving Phase Change

Figure 7:
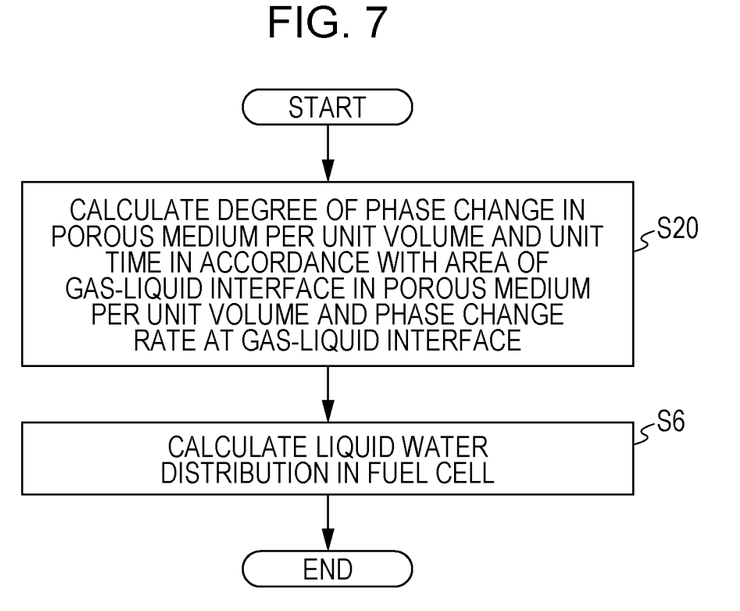
FIG. 7 is a flowchart illustrating an example of a method for simulating a phenomenon involving phase change according to a second embodiment of the present disclosure.

A method for simulating a phenomenon involving phase change is performed by, for example, the simulation apparatus 10 in accordance with the process flow in a flowchart illustrated in FIG. 7. In the flowchart illustrated in FIG. 7, in addition to the processing operation in step S20 in FIG. 10, the processing operation in step S6 is performed. It should be noted that, before the processing operation in step S20 in FIG. 7 is performed, the processing operations in steps S21 to S23 in FIG. 11 or the processing operation in step S24 in FIG. 12 may be performed. Likewise, before the processing operation in step S20 in FIG. 7 is performed, the processing operation in step S25 in FIG. 13 or the processing operation in step S26 in FIG. 14 may be performed.

The operation processing unit 11 of the simulation apparatus 10 calculates the phase change rate in the porous medium 20 per unit volume (the degree of phase change $r_w$ per unit volume and unit time) (step S20). Here, the degree of phase change $r_w$ of the liquid water 24 per unit volume and unit time is obtained by performing the processing in step S20.

The operation processing unit 11 also calculates the distribution of the liquid water 24 (the liquid water distribution) in the fuel cell 50 based on the degree of phase change $r_w$ of the liquid water 24 per unit volume and unit time (step S6). The liquid water distribution in the fuel cell 50 is obtained by using Equation 4 as described above.

In this method for simulating a phenomenon involving phase change, the liquid water distribution in the fuel cell 50 is calculated based on the degree of phase change $r_w$ of the liquid water 24 per unit volume and unit time. This enables highly accurate simulation of the liquid water distribution in the fuel cell 50 in consideration of the area of the gas-liquid interface of the liquid water 24 at which phase change occurs in the porous medium 20 by using the degree of phase change $r_w$ of the liquid water 24 per unit volume and unit time based on the specific surface area $S_f$ of the liquid water 24.

Furthermore, the transfer of the liquid water 24 in the porous medium 20 depends on the degree of phase change $r_w$ of the liquid water 24 per unit volume and unit time obtained by using in Equation 4. This method therefore enables highly accurate simulation of the fuel cell 50 including a member composed of the porous medium 20 in consideration of the transfer of the liquid water 24.

Third Embodiment

The simulation apparatus 10 according to a third embodiment of the present disclosure projects the potential distribution in the fuel cell 50 illustrated in FIG. 6 as the electricity generation performance. The potential distribution in the fuel cell 50 is obtained based on the distribution of the liquid water 24 (the liquid water distribution) and the gas distribution in the fuel cell 50. The gas distribution in the fuel cell 50 is calculated by using an effective mutual diffusion coefficient of the gas.

Determination of Effective Mutual Gas Diffusion Coefficient

Figure 8:
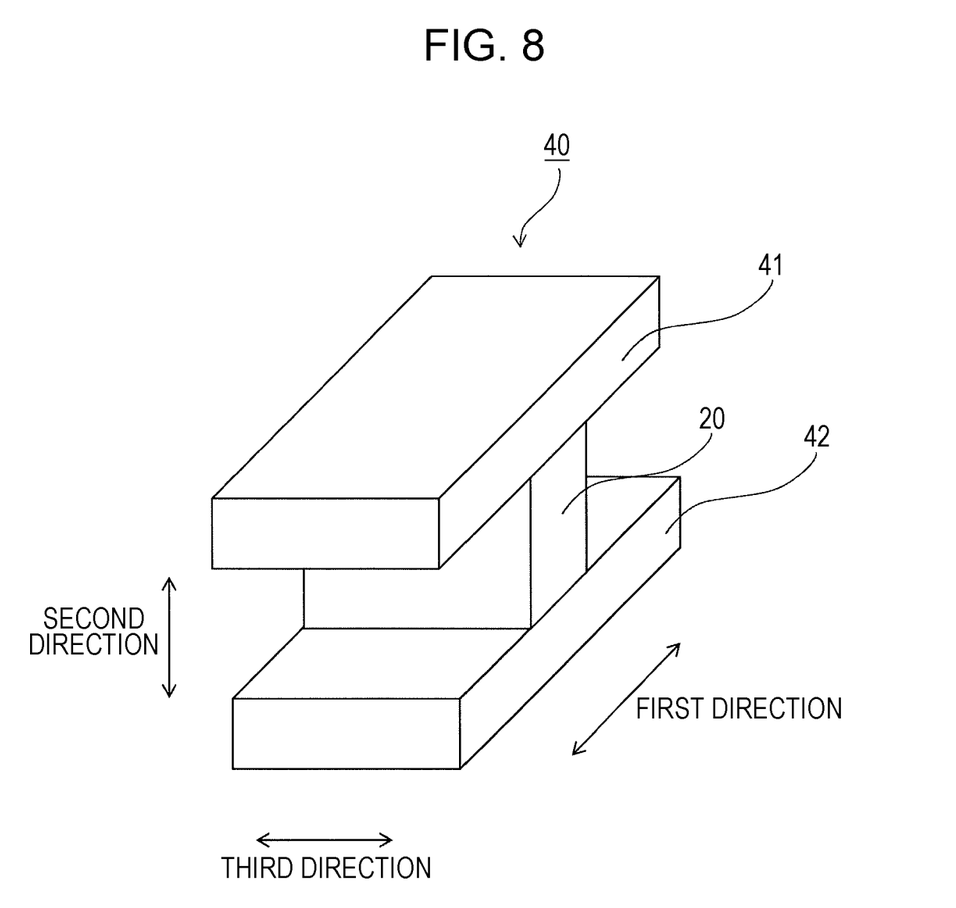
FIG. 8 is a schematic perspective view of an analysis area relating to the mutual gas diffusion coefficient.

Gas is diffused such that gas particles moves through the voids 23 in the pores 22. Concerning the gas diffusion, in the gas diffusion simulation performed by using a simulation method according to the concept of the Boltzmann equation, an analysis area 40 having a passage structure illustrated in FIG. 8 is used.

The analysis area 40 includes the porous medium 20, a first passage 41, and a second passage 42. For example, the first passage 41 and the second passage 42 each have a rectangular section, extend in a first direction, and are disposed spaced apart from and in parallel to each other. The porous medium 20 is, for example, a cuboid that is placed between the first passage 41 and the second passage 42 and extends in a second direction perpendicular to the first direction.

The measurement of the porous medium 20 in the first direction is shorter than the measurement of the first passage 41 and the measurement of the second passage 42. The measurement of the porous medium 20 in the second direction is longer than the measurement of the first passage 41 and the measurement of the second passage 42. The measurement of the porous medium 20 in a third direction perpendicular to both the first direction and the second direction is equal to the measurement of the first passage 41 and the measurement of the second passage 42.

In the analysis area 40, the porous medium 20 is connected to the first passage 41 and the second passage 42 and the pores 22 in the porous medium 20 communicate with the first passage 41 and the second passage 42. The pores 22 extend between the side of the first passage 41 and the side of the second passage 42 and the first passage 41 and the second passage 42 communicate with each other via the pores 22.

The porous medium 20 is filled with the liquid water 24, and the voids 23 formed in the pores 22 communicate with the first passage 41 and the second passage 42. Different kinds of gases (a first gas and a second gas) flow respectively into the first passage 41 and the second passage 42. The flow rates of these gases are all set at an average flow rate of gas that flows in a catalyst layer of an actual fuel cell.

Particles of the first gas (first gas particles i) flow in from the inlet of the first passage 41, among which some particles flow in the voids 23 of the porous medium 20 and diffuse through the voids 23 and the remainder flows out from the outlet of the first passage 41. Particles of the second gas (second gas particles j) flow in from the inlet of the second passage 42, among which some particles flow in the voids 23 of the porous medium 20 and diffuse through the voids 23 and the remainder flows out from the outlet of the second passage 42.

The mole fraction of the first gas at the outlet of the first passage 41 and the mole fraction of the second gas at the outlet of the second passage 42 depend on the diffusion behavior of the first gas and the second gas (mutual gas diffusion) in the voids 23. Therefore, an effective mutual diffusion coefficient $D_{ij}^{\mathit{eff}}$ is obtained by adjusting the effective mutual diffusion coefficient $D_{ij}^{\mathit{eff}}$ to match the mole fraction of the first gas at the outlet of the first passage 41 and the mole fraction of the second gas at the outlet of the second passage 42 in the gas diffusion simulation using the lattice Boltzmann method to mole fractions in the Stefan-Maxwell equation indicated below as Equation 5. This can be calculated by using, for example, thermal-fluid analysis software such as FLUENT.

$$\sum_{\substack{j=1 \\ j \neq i}}^{N} \frac{X_i X_j}{D_{ij}^{\mathit{eff}}} (\vec{V}_j - \vec{V}_i) = \Delta X_i \qquad \text{(Equation 5)}$$

In Equation 5, $X_i$ is the mole fraction of the first gas particle i and $X_j$ is the mole fraction of the second gas particle j. $V_i$ is the rate of the first gas particle i and $V_j$ is the rate of the second gas particle j. $D_{ij}^{\mathit{eff}}$ is the effective mutual diffusion coefficient (the effective mutual gas diffusion coefficient) of the first gas particles i and the second gas particles j. The effective mutual gas diffusion coefficient $D_{ij}^{\mathit{eff}}$ is obtained in consideration of the shape of the porous medium 20 and the liquid water distribution in the porous medium 20.

The liquid water distribution in the porous medium 20 depends on the filling rate of the liquid water 24 in the porous medium 20. The effective mutual gas diffusion coefficient $D_{ij}^{\mathit{eff}}$ is thus obtained as a function in which the filling rate is used as a variable.

Determination of Potential Distribution in Fuel Cell

The potential of the fuel cell 50 is calculated based on equations relating to electrons and protons indicated below as Equations 6, 7, and 8. This can be calculated by using software such as FLUENT.

$$\nabla \cdot (\sigma_e^- \nabla \varphi_e^-) = R_{cat} \qquad \text{(Equation 6)}$$

$$\nabla \cdot (\sigma_H^+ \nabla \varphi_H^+) = -R_{cat} \qquad \text{(Equation 7)}$$

In Equation 6, $\sigma_e^-$ is the electrical conductivity of an electron and $\psi_e^-$ is the potential of an electron. In Equation 7, $\sigma_H^+$ is the electrical conductivity of a proton and $\psi_H^+$ is the potential of a proton. In Equations 6 and 7, $R_{cat}$ is the density of a current generated by electrons chemically excited at the catalyst layer 52 and obtained by using the Butler-Volmer equation indicated below as Equation 8.

$$R_{cat} = \zeta_{cat} j_{cat} \left( \frac{[O_2]}{[O_2]_{ref}} \right)^{\gamma_{cat}} (e^{-\alpha_{cat} F \eta_{cat}/RT}) \qquad \text{(Equation 8)}$$

In Equation 8, $\zeta_{cat}$ is the effective area of platinum in the catalyst layer 52 and $j_{cat}$ is the reference exchange current density. $[O_2]$ is the mole fraction of oxygen and is the gas distribution $\nabla X_i$ in Equation 5 described above. $[O_2]_{ref}$ is the reference oxygen mole fraction. $\gamma_{cat}$ is the degree of concentration, $a_{cat}$ is the transfer coefficient, F is the Faraday constant, R is the gas constant, and T is the temperature.

Method for Simulating Phenomenon Involving Phase Change

Figure 9:
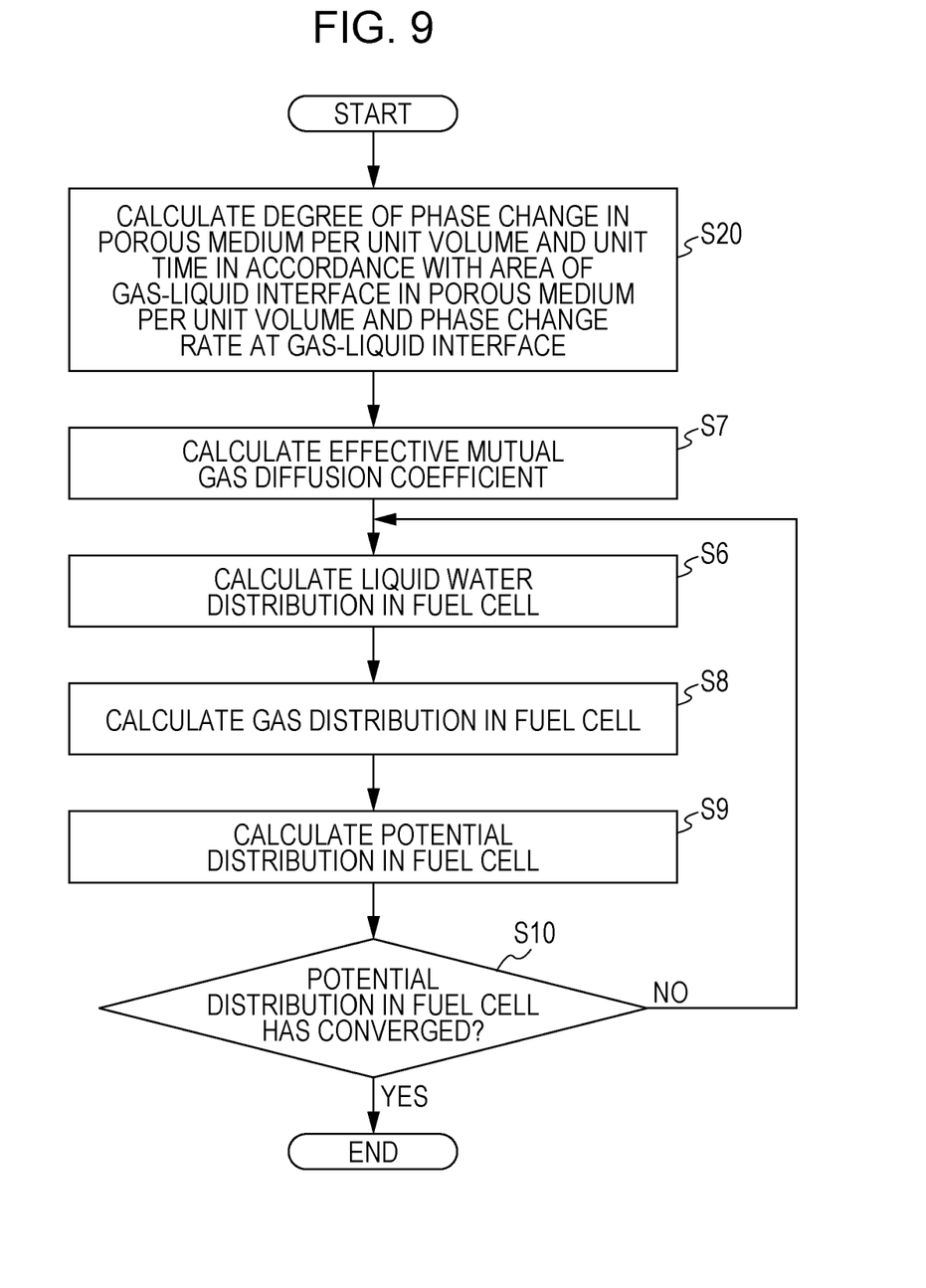
FIG. 9 is a flowchart illustrating an example of a method for simulating a phenomenon involving phase change according to a third embodiment of the present disclosure.

A method for simulating a phenomenon involving phase change is performed by, for example, the simulation apparatus 10 in accordance with the process flow in a flowchart illustrated in FIG. 9. In the flowchart illustrated in FIG. 9, in addition to the processing operations in steps S20 and S6 in FIG. 7, the processing operations in steps S7 to S10 are performed. The processing operation in step S7 is performed between steps S20 and S6 and the processing operations in steps S8 to S10 are performed after step S6.

It should be noted that, in the flowchart in FIG. 9, before the processing operation in step S20 is performed, the processing operations in steps S21 to S23 in FIG. 11 or the processing operation in step S24 in FIG. 12 may be performed. Likewise, before the processing operation in step S20 in FIG. 9 is performed, the processing operation in step S25 in FIG. 13 or the processing operation in step S26 in FIG. 14 may be performed.

The operation processing unit 11 of the simulation apparatus 10 calculates the phase change rate in the porous medium 20 per unit volume (the degree of phase change $r_w$ per unit volume and unit time) (step S5). Here, the degree of phase change $r_w$ of the liquid water 24 per unit volume and unit time is obtained by performing the processing in step S20.

The operation processing unit 11 calculates the effective mutual diffusion coefficient $D_{ij}^{\mathit{eff}}$ of gases (step S7). The effective mutual diffusion coefficient $D_{ij}^{\mathit{eff}}$ is obtained based on, for example, the result of the gas diffusion simulation employing a simulation method based on the concept of the Boltzmann equation by using the Stefan-Maxwell equation indicated as Equation 5 described above.

The operation processing unit 11 subsequently calculates the liquid water distribution in the fuel cell 50 (step S6). Here, the liquid water distribution in the fuel cell 50 is obtained by calculating the filling rate s of the liquid water 24 based on Equation 4.

The operation processing unit 11 calculates, with respect to the fuel cell 50, the effective permeability coefficient in Equation 4, the effective electrical conductivity of an electron in Equation 6 and the effective electrical conductivity of a proton in Equation 7, and the effective heat conduction coefficient in Equation 10 by using the discrete Boltzmann equation indicated as Equation 9. In Equation 9, $\alpha$ is the index of phase space coordinates, $f_i$ is the distribution function of i-type particle, and $\Omega_{ij}^{\alpha}$ is the collision term of i-type and j-type particles. In Equation 10, $j_T$ is the heat flux, $\sigma_T^{\mathit{eff}}$ is the effective thermal conductivity, and T is the temperature.

$$\left( \frac{\partial}{\partial t} + c_\alpha \cdot \nabla \right) [f_i(x, c_\alpha, t)] = -\frac{1}{\phi}(f_i(x, c_\alpha, t) - f_i^{(0)}) + \sum_{j \neq i} \Omega_{ij}^{\alpha} \qquad \text{(Equation 9)}$$

$$\vec{J_T} = -\sigma_T^{\mathit{eff}} \nabla T \qquad \text{(Equation 10)}$$

The operation processing unit 11 subsequently calculates the gas distribution in the fuel cell 50 (step S8). Here, the conditions of the fuel cell 50 are substituted in Equation 5 using the effective mutual diffusion coefficient $D_{ij}^{\mathit{eff}}$ obtained in step S6. By calculating the mole fractions of gases in this manner, the gas distribution in the fuel cell 50 is obtained.

The operation processing unit 11 then calculates the potential distribution in the fuel cell 50 (step S9). Here, the potential distribution in the fuel cell 50 is obtained by calculating the potential based on Equations 6 to 8 described above.

The operation processing unit 11 then determines whether the potential distribution in the fuel cell 50 has converged (step S10). In a case where the amount of change in potential calculated in step S9 is greater than a predetermined value, it is determined that the potential distribution has not converged (NO in step S10), and thus, the process returns to step S6 and the processing operations in steps S6, and S8 to S10 are repeated. Conversely, in a case where the amount of change in potential is equal to or less than the predetermined value, it is determined that the potential distribution has converged (YES in step S10) and the simulation process ends.

In this method for simulating a phenomenon involving phase change, the liquid water distribution in the fuel cell 50 is calculated based on the degree of phase change $r_w$ of the liquid water 24 per unit volume and unit time. Furthermore, the effective mutual diffusion coefficient $D_{ij}^{eff}$ of gases diffusing through the voids 23 other than the liquid water 24 in the pores 22 by using the simulation method based on the concept of the Boltzmann equation, and accordingly, the gas distribution in the fuel cell 50 is calculated. Moreover, based on the liquid water distribution and the gas distribution in the fuel cell 50, the potential distribution in the fuel cell 50 is calculated.

In this manner, by taking account of the liquid water distribution, it is possible to perform highly accurate simulation of potential in the fuel cell 50 in consideration of possible phenomena such as flooding caused by an excessive amount of the liquid water 24 in the fuel cell 50.

Further, the liquid water distribution is obtained in steps S6, S8, and S9, the gas distribution is accordingly obtained, and based on the behavior of the gas, the potential in the fuel cell 50 is obtained. In this manner, by taking account of the liquid water distribution, it is possible to perform highly accurate simulation of potential in the fuel cell 50 in consideration of possible phenomena such as flooding caused by an excessive amount of the liquid water 24 in the fuel cell 50.

It should be noted that the configurations explained in the embodiments described above are mere examples and various modification may be made as appropriate. According to the description above, various improvements and other embodiments of the present disclosure will be apparent to those skilled in the art. Accordingly, the above description should be construed as illustrative only, and is provided for the purpose of teaching the best mode for carrying out the disclosure to those skilled in the art. It is possible to substantially change the details of the structure and/or the function without departing from the spirit of the present disclosure.

The simulation method of the present disclosure is useful as, for example, a method for simulating with high accuracy a phenomenon involving phase change.

What is claimed is:

1. A method of simulating an electricity generation performance of a fuel cell including a porous medium included in at least one of a catalyst layer or a gas diffusion layer, the method comprising:
   calculating, by a processor, a degree of phase change of liquid water in the porous medium per unit volume and unit time based on:
   an area of a gas-liquid interface in the porous medium per unit volume, and a phase change rate at the gas-liquid interface;
   calculating, by the processor, an effective mutual diffusion coefficient of gases diffusing in voids other than the liquid water in the porous medium by using a simulation method based on a concept of a Boltzmann equation by using Stefan-Maxwell equation;
   calculating, by the processor, a gas distribution of the gases in the fuel cell based on the effective mutual diffusion coefficient of the gases;
   calculating, by the processor, a liquid water distribution in the fuel cell including the porous medium based on the degree of phase change in the porous medium per unit volume and unit time; and
   calculating, by the processor, a potential distribution in the fuel cell, as the electricity generation performance, based on the liquid water distribution in the fuel cell and the gas distribution in the fuel cell, wherein the calculating the liquid water distribution is performed by using $$\frac{\partial \varepsilon \rho_l s}{\partial t} + \nabla \cdot \left( \rho_l \frac{K}{\mu_l} \frac{dP_c}{ds} \nabla s \right) = r_w$$

where e is a ratio of voids to pores, pi is a density of the liquid water, s is a filling rate of the liquid water in the pores, t is time, K is permeability of the liquid water, r is a degree of the filling rate of the liquid water, Pc is a capillary pressure, $\mu_l$ is viscosity of the liquid water, and $r_w$ is the degree of phase change of the liquid water per unit volume and unit time.

2. A simulation apparatus for simulating an electricity generation performance of a fuel cell including a porous medium included in at least one of a catalyst layer or a gas diffusion, comprising:
   a processor; and
   a non-transitory storage storing a program, wherein:
   the program, when executed by the processor, causes the processor to:
   calculate a degree of phase change of liquid water in the porous medium per unit volume and unit time based on:
   an area of a gas-liquid interface in the porous medium per unit volume, and
   a phase change rate at the gas-liquid interface;
   calculate an effective mutual diffusion coefficient of gases diffusing in voids other than the liquid water in the porous medium by using a simulation method based on a concept of a Boltzmann equation by using Stefan-Maxwell equation;
   calculate a gas distribution of the gases in the fuel cell based on the effective mutual diffusion coefficient of the gases;
   calculate a liquid water distribution in the fuel cell including the porous medium based on the degree of phase change in the porous medium per unit volume and unit time; and
   calculate a potential distribution in the fuel cell, as the electricity generation performance, based on the liquid water distribution in the fuel cell and the gas distribution in the fuel cell,
   wherein the liquid water distribution is calculated by using $$\frac{\partial \varepsilon \rho_l s}{\partial t} + \nabla \cdot \left( \rho_l \frac{K}{\mu_l} \frac{dP_c}{ds} \nabla s \right) = r_w$$

where e is a ratio of voids to pores, pi is a density of the liquid water, s is a filling rate of the liquid water in the pores, t is time, K is permeability of the liquid water, r is a degree of the filling rate of the liquid water, Pc is a capillary pressure, $\mu_l$ is viscosity of the liquid water, and $r_w$ is the degree of phase change of the liquid water per unit volume and unit time.

\* \* \* \* \*